United States Patent Office 2,906,735
Patented Sept. 29, 1959

2,906,735

PREPARATION OF ORGANOSILICON ESTERS

John L. Speier, Midland, Mich., assignor to Dow Corning Corporation, Midland, Mich., a corporation of Michigan No Drawing. Application June 26, 1958
Serial No. 744,672

9 Claims. (Cl. 260—46.5)

The present invention relates to a process for the preparation of organosilicon esters. This application is a continuation-in-part of my copending application Serial No. 598,528, filed July 18, 1956.

More specifically, this invention relates to a process which comprises reacting (I) an organosilicon compound selected from the group consisting of (A) cyclosilalkoxanes having the general formula $$[-SiR_2CH_2CHZ(CH_2)_nO-]_x$$

where $x$ has an average value of at least 1, (B) linear polymeric silalkoxanes consisting essentially of units of the formula $[-SiR_2CH_2CHZ(CH_2)_nO-]$, and (C) copolymeric siloxanes consisting essentially of (1) from 5 to 99.9 inclusive molar percent of units of the formula

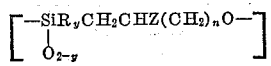

where $y$ is an integer of from 1 to 2 inclusive and (2) from 0.1 to 95 inclusive molar percent of units of the formula $$R'_mSiO_{\frac{4-m}{2}}$$

where $m$ is an integer of from 1 to 3 inclusive and has an average value not greater than 2.5, in the above formulas R being a monovalent hydrocarbon radical free of aliphatic unsaturation, R' being a monovalent hydrocarbon radical, Z being selected from the group consisting of H and CH₃, and $n$ being an integer of from 1 to 2 inclusive; with (II) a carboxylic acid, by contacting (I) and (II) in a liquid phase.

The organosilicon reactants described above can be prepared by the methods described in my aforesaid copending application. In brief, those reactants which contain two R groups can be prepared by first reacting R₂HSiCl with the appropriate alkenyl acetate, $$CH_2=CHZ(CH_2)_nOAc$$

where Ac represents the acetyl radical, in the presence of chloroplatinic acid or Pt deposited on charcoal to produce the corresponding acetoxyalkyl substituted derivative R₂Si[CH₂CHZ(CH₂)ₙOAc]Cl. This reaction is best carried out at 80° to 180° C., using about 1×10⁻⁵ mol of the acid catalyst per mol of the silane. The product is then hydrolyzed to yield the corresponding disiloxane [AcO(CH₂)ₙCHZCH₂R₂Si]₂O. The latter is subjected to typical alcoholysis procedures by treating it with an alcohol and an acid or alkaline catalyst, e.g. HCl or NaOH, to produce the intermediate $$[HO(CH_2)_nCHZCH_2R_2Si]_2O$$

When the latter is heated, one mol of water is split out for each mol of the disiloxane to produce the cyclic compounds A employed in this invention. When these cyclics stand in contact with water they revert back partially to the disiloxane dialcohol, hence the water must be removed from the system if the cyclics are to be recovered as such. This can be done by azeotropic distillation, by distilling from dehydrating agents, or by sending the distillate from the defined disiloxane through a moisture acceptor such as freshly fired alumina.

The major initial product from the above process is the cyclic compound where $x$ is 1, i.e.:

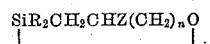

Higher cyclics, where $x$ ranges from 2 up to an undeterminately large number, remain in the distillation residue from the above process and are also formed when the above "monomeric" cyclic stands at room temperature. Linear polymers containing the same unit as that present in the above cyclic are also formed during the distillation of the cyclic or during the heating of the disiloxane dialcohol. Linear polymers are also formed when the cyclic stands in the presence of a trace of water, in which case the hydroxy endblocked polymer $$HO[-SiR_2CH_2CHZ(CH_2)_nO-]_zH$$

is formed, where $z$ has an average value of at least 2.

Since all forms of the cyclic and linear polymers discussed above are operative herein, there is no particular need to isolate any particular species. Thus, the water which is split out of the disiloxane dialcohol can be removed from the system either in whole or in part, and the residue, which would contain all of the above species, can then be used in this invention without further purification. The silicon atoms in the above cyclic and linear compounds are linked by what may be called alkoxy bridges, hence they are not "siloxanes" in the usual sense of that term, and are referred to herein as "silalkoxanes."

The copolymeric siloxane reactants C used in this invention consist essentially of from 5 to 99.9 inclusive molar percent of units of the formula

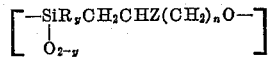

where $y$ is 1 or 2 and from 0.1 to 95 inclusive molar percent of units of the formula $$R'_mSiO_{\frac{4-m}{2}}$$

where $m$ is an integer of from 1 to 3 inclusive and has an average value not greater than 2.5. Those copolymers containing the units in which $y$ is 2 can be prepared by mixing the linear or cyclic polymers previously discussed with a conventional organosiloxane polymer containing the $$R'_mSiO_{\frac{4-m}{2}}$$

units, and exposing the mixture to the action of any of the well-known organosiloxane rearrangement or polymerization catalysts. For example, the mixture can be heated to about 160° C. in the presence of KOH or NaOH added in an amount of about 1 K or Na atom for every 500 to 5,000 Si atoms.

Polymers and copolymers containing the defined $$R'_mSiO_{\frac{4-m}{2}}$$

units are well known in the art. Fractional values for $m$ are obtained when more than one type of the units R'SiO₁.₅, R'₂SiO, and R'₃SiO.₅ are present. The R and R' radicals in any particular copolymer can be the same or different radicals.

The C reactants where $y$ is either 1 or 2 can be prepared by cohydrolyzing R'ₘSiCl₄₋ₘ with $$R_ySi[CH_2CHZ(CH_2)_nOAc]Cl_{3-y}$$

compounds to produce the corresponding acetoxyalkyl substituted organosiloxane copolymer, using conventional organosilane hydrolysis techniques, and then subjecting the copolymer to the alcoholysis and dehydration steps discussed previously. The acetoxyalkyl chlorosilane reactant above where $y$ is 1 can of course be prepared in the same manner as previously indicated for the compound where $y$ is 2, except that $RHSiCl_2$ is used as the starting silane.

It is obvious that in the silalkoxane units of the C copolymeric reactants, the open bond shown on the Si atom (or both open bonds if $y$ is 2) is satisfied by an oxygen atom which is part of either another silalkoxane unit or of an

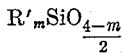

unit. Each open bond of the oxygen atom or atoms in the illustrated silalkoxane unit is likewise obviously satisfied by a Si atom which is part of another silalkoxane or

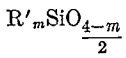

unit. Of course the copolymer can also contain small amounts of uncondensed silicon bonded hydroxyl groups and/or unhydrolyzed silicon bonded hydrolyzable groups, as is conventional in practically all organosiloxane polymers. Any of the organosilicon reactants other than the pure cyclic species can of course also contain small amounts of the hydroxyalkyl radicals from the incomplete dehydration of the siloxane alcohol intermediates.

As has been noted, the R radicals in the above compounds can be any monovalent hydrocarbon radical free of aliphatic unsaturation. Examples of suitable radicals include alkyl radicals such as methyl, ethyl, and octadecyl; aralkyl radicals such as benzyl; alkaryl radicals such as tolyl and xylyl; aryl radicals such as phenyl, xenyl, and naphthyl; and cycloaliphatic radicals such as cyclohexyl. The R' radicals need not be free of aliphatic unsaturation. Thus suitable R' radicals include those exemplifying the R radicals above, as well as alkenyl and acetylenic radicals, e.g., allyl, vinyl and hexenyl. The most preferred of both the R and R' radicals are methyl, ethyl, and phenyl.

The carboxylic acid reactant II employed in this invention can be any carboxylic acid, including the di- and polycarboxylic acids. The preferred acids are those of the formulas $R^2COOH$ and $R^3(COOH)_2$, where $R^2$ and $R^3$ represent monovalent and divalent organic radicals respectively, and are respectively selected from the group consisting of monovalent and divalent hydrocarbon, halogenated hydrocarbon, hydroxy substituted hydrocarbon, alkoxy substituted hydrocarbon, aryloxy substituted hydrocarbon, and haloaryloxy substituted hydrocarbon radicals.

The defined $R^2$ and $R^3$ radicals are inert in the reaction of this invention, and hence all radicals within the definition are operative. Preferably the $R^2$ and $R^3$ radicals contain no more than 18 carbon atoms. In regard to the $R^2$ radicals, examples of suitable hydrocarbon radicals are alkyl (e.g. methyl, ethyl, isopropyl, t-butyl, and octadecyl); aryl (e.g. phenyl, xenyl, naphthyl); aralkyl (e.g. benzyl); alkaryl (e.g. tolyl); alkenyl (e.g. vinyl, allyl, isopropenyl, octadecenyl); alkynyl (e.g. propynyl) and cycloalkyl (e.g. cyclohexyl). The $R^3$ hydrocarbon radicals are the divalent radicals corresponding to all of these. The hydrocarbon radicals illustrated above can be halogenated with chlorine, bromine, fluorine, or iodine (preferably in an amount not exceeding 5 halogen atoms per molecule), and they can be hydroxy substituted radicals, with a preferred maximum of three hydroxy groups per molecule. As noted, the hydrocarbon radicals also can be substituted with alkoxy radicals (preferably 1 to 12 carbon atoms), aryloxy radicals (preferably phenoxy), and haloaryloxy radicals (preferably chloro- or bromophenoxy, with a preferred maximum of five halogen atoms per aryloxy radical).

Illustrative examples of suitable monocarboxylic hydrocarbon acids include the saturated aliphatic acids such as formic, acetic, valeric, methylethylacetic, trimethylacetic, caproic, lauric, and stearic acids; and unsaturated aliphatic and aromatic acids such as benzoic, naphthoic, acrylic, methacrylic, crotonic, isocrotonic, vinylacetic, undecylenic, and oleic acids; along with di- and triolefinic and acetylenic acids such as betavinylacrylic, sorbic, linoleic, linolenic, elaeostearic, and propynoic acids. Suitable dicarboxylic acids include the straight and branched chain, saturated and unsaturated aliphatics, cycloaliphatics, and aromatics, e.g. malonic, methylmalonic, succinic, glutaric, adipic, azelaic, sebacic, nonadecanedioic ("Japanic"), maleic, dimethylfumaric, phthalic, isophthalic, terephthalic, naphthalic and diphenic acids and cyclohexyl-, stilbene-, tolane-, and dibenzyldicarboxylic acids.

Specific examples of suitable hydroxy substituted organic acids are the aliphatic hydroxy acids such as glycolic, lactic, beta-hydroxybutyric, gamma-hydroxybutric, 12-hydroxystearic, malic, and tartaric acids; the aromatic hydroxy acids such as salicylic, gallic (3,4,5-trihydroxybenzoic), hydroxyterephthalic, parahydroxycinnamic, 3,4-dihydroxycinnamic, 5-hydroxynaphthoic, and the various cresotic acids; and alicyclic hydroxy acids such as guinic acid.

Suitable alkoxy, aryloxy, and haloaryloxy substituted acids are, e.g., those in which such a group is present in place of the OH group or second carboxylic group in the above discussed acids. Specific examples of suitable acids of this type include 2,4-dichlorophenoxyacetic, p-bromophenoxyacetic, trifluoromethylphenoxyacetic, p-iodophenoxyacetic, phenoxyacetic, biphenyloxyacetic, ethoxyacetic, 12-butoxyoctadecanoic, o-, m-, or p-ethoxybenzoic, o-phenoxybenzoic, and dichlorophenoxybenzoic acids. Preferably the alkoxy or aryloxy radical, when present, contains less than 13 carbon atoms; and any haloaryloxy radical preferably contains less than 6 halogen atoms.

Any of the halogenated hydrocarbon carboxylic acids can also be used herein, although the chlorinated, fluorinated, or brominated derivatives are preferred. Suitable acids of this type are exemplified by trifluoroacetic, 9,10,12,13-tetrabromooctadecanoic, alpha-chloroacrylic, beta-bromocinnamic, o-, m-, or p-fluoro- or iodobenzoic, and pentabromobenzoic acids.

The reaction which takes place in the process of this invention is one in which only the carboxylic acid and the silalkoxane units present in the organosilicon reactant take part. Hence, in its most simple form the reaction can be illustrated as follows:

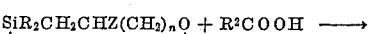

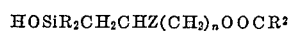

The silicon bonded hydroxyl groups then condense with one another, so that in this particular instance the product would be the disiloxane

If the silalkoxane is a larger cyclic or a linear polymer of the same units, each silalkoxane unit is cleaved from the other and the same end product is obtained.

When the silalkoxane units are present in the organosilicon reactant as part of a copolymer containing conventional organosiloxane units, cleavage occurs between the siloxane unit and the oxygen of the silalkoxy unit to produce polymeric products containing the ester group. Thus, for example, if a portion of a copolymer has the following configuration:

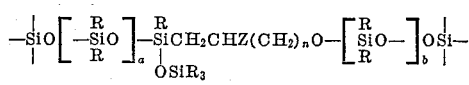

its reaction in accordance with this invention would result in the formation of a copolymer in which the corresponding portion would take the configuration:

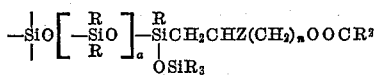

If a dicarboxylic acid has been used, two types of products can be obtained. Where only one of the two carboxylic groups has reacted, the product of course takes the form ≡SiCH$_2$CHZ(CH$_2$)$_n$OOCR$^3$COOH. Where both carboxylic groups have reacted, the acid acts as a linking mechanism between two former silalkoxane groups, so that the portion of the molecule in question would have the form —(CH$_2$)$_n$OOCR$^3$COO(CH$_2$)$_n$—.

There is no particular limiting ratio of reactants in the defined reaction. As is obvious from the above description, one carboxylic acid group reacts with one silalkoxane unit. Any excess of either reactant can be present, however, for an excess of silalkoxane units only leads to partial conversion to ester substituted products, and an excess of the acid reactant only remains an unreacted component in the reaction mass. Ordinarily from 0.5 to 2 equivalents of carboxy groups for each silalkoxane unit will be a desirable ratio to employ.

The reaction should be carried out in a liquid phase, and any temperature suitable to provide such a phase can be used. If no catalyst is present the reaction may be very slow at room temperature, particularly when a weak carboxylic acid is the reactant, hence it is often desirable to operate at, e.g., 50° to 150° C. in order to improve the yield of product. These elevated temperatures can also be used to increase the solubility of the carboxylic acid in the organosilicon compound, thus improving the contact between the reactants, or to convert a solid reactant to the liquid state. Mutual solvents such as dioxane or acetone are sometimes advantageously used in order to provide better contact between the reactants, particularly if a solubility problem exists in a given system.

Although catalysts are not essential to obtain a degree of reaction in this invention, they are generally desirable in a commercial process to improve the yield of product and to lower the reaction temperature and time required to obtain a commercially desirable yield. Acids having a dissociation constant of at least 0.01 at 25° C. are suitable for this purpose. Relatively few of the carboxylic acids meet this requirement, but those that do (e.g., dichloroacetic, trichloroacetic, trifluoroacetic, maleic and oxalic acids) can be used either as reactants or as catalysts in the reaction, or they can serve both functions at one time. The definition of suitable acid catalysts is intended to include the strong inorganic acids whose constants are too high to be meaningfully measurable, e.g., sulfuric and hydrochloric acids.

Any acid having the required dissociation constant can be used, and it can be mono- or polybasic. Where a polybasic acid is used, it is the constant for the "first hydrogen" which is controlling in meeting the defined limitation. Examples of suitable catalysts in addition to those mentioned above include iodic, perchloric, nitric, periodic, hydrobromic, hydroiodic, phosphoric, sulfurous, benzenesulfonic, and p-toluenesulfonic acids.

Any amount of the acid catalyst will have some beneficial effect on the reaction, but ordinarily it is desirable to use at least 0.01 percent by weight based on the weight of the organosilicon compound present. In general, from 0.1 to 10 inclusive percent by weight is a preferred amount.

The ester substituted products of the process of this invention are of known utility, both for their polymeric properties in the fields of coating agents, electrical insulation, and the like, and for their use as intermediates in resin preparations which make use of the reactivity of the ester group.

The following examples are illustrative only. All parts are parts by weight unless otherwise specified. The symbols Me, Et, and Ph have been used to represent methyl, ethyl, and phenyl radicals respectively.

EXAMPLE 1

The cyclic compound

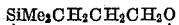

B.P. 103° C. at 740 mm. Hg, $n_D^{25}$ 1.4415 was prepared by heating Me$_2$SiHCl and allyl acetate at reflux in the presence of a catalyst consisting of 1% by weight Pt deposited on charcoal, hydrolyzing the acetoxy substituted addition product, subjecting the hydrolyzate to saponification and alcoholysis, and heating the reaction mass at about 160° C. while distilling off the product through a column packed with freshly fired alumina to act as a moisture acceptor. Upon standing at room temperature for a number of days the cyclic became a viscous material containing higher cyclics of the same unit formula as well as high molecular weight linear polymers of the general formula HO(SiMe$_2$CH$_2$CH$_2$CH$_2$O)$_x$H where $x$ had values ranging from 2 upwards to undeterminable values. The refractive index of this mixture increased throughout this time to a finally constant value of 1.4535.

A mixture of 5.8 parts of the viscous form of the above polymer, 6 parts of glacial acetic acid, and 0.36 parts of concentrated sulfuric acid was allowed to stand 24 hours at room temperature. The reaction mass was washed with water until neutral, and then dried over anhydrous sodium sulfate. Analysis of the dried product showed that almost a quantitative yield of

had been obtained, Ac representing an acetyl group. Repetition of the experiment using the cyclic in its freshly distilled form rather than its viscous polymeric form provided the same results.

EXAMPLE 2

A mixture of 11.6 parts of the viscous polymer prepared as in Example 1, 14.2 parts acrylic acid, 1 part concentrated H$_2$SO$_4$, and 1 part hydroquinone (to inhibit any possible polymerization of the acrylic acid) was allowed to stand at room temperature for five days. The mixture was washed with water to remove the excess acrylic acid present, and then washed with an aqueous NaOH solution to remove the hydroquinone. Analysis of the reaction product showed that a major portion of the starting polymer had been converted to the disiloxane of the formula

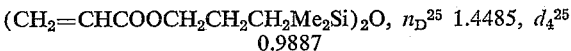

The use of the freshly distilled cyclic in place of the viscous polymer in the above procedure gives the same results.

EXAMPLE 3

A mixture of 34.8 parts of the viscous polymer prepared as in Example 1, 51.6 parts methacrylic acid, 3 parts concentrated H$_2$SO$_4$, and 3 parts hydroquinone was allowed to stand at room temperature for 3 days. About 44 parts of benzene were added, and 2.5 parts of water were removed by azeotropic distillation. The solution was washed with water and a sodium bicarbonate solution until neutral, and then dried. An attempt to distill a portion of the product resulted in its polymerization. Accordingly 5 parts of hydroquinone and 1 part of N-N'-di-2-naphthyl-p-phenylenediamine were added to the remaining portion and distillation was again attempted. Polymerization was prevented by thees additives, but no distillate was obtained up to a temperature of 200° C. at 3 mm. Hg. The additives were removed by washing with a 1% aqueous NaOH solution and the material was dried over sodium sulfate. Analyses for percent Si and saponification equivalent indicated that the material was almost entirely the disiloxane $$[CH_2=C(Me)COOCH_2CH_2CH_2Me_2Si]_2O.$$

EXAMPLE 4

When methallyl acetate is substituted for the allyl acetate used in Example 1 in an otherwise identical process, polymers consisting essentially of units of the formula [—SiMe$_2$CH$_2$CH(Me)CH$_2$O—] are produced. Likewise the use of allyl carbinol acetate, CH$_2$=CHCH$_2$CH$_2$OAc, leads to polymers containing the corresponding [—SiMe$_2$(CH$_2$)$_4$O—] units. When these polymers are reacted with acetic acid as in Example 1, the corresponding acetoxy substituted disiloxanes are produced.

EXAMPLE 5

When MePhSiHCl, EtPhSiHCl, or Et$_2$SiHCl are substituted for the Me$_2$SiHCl in the process of Example 1, polymers containing the corresponding $$(-SiR_2CH_2CH_2CH_2O-)$$

units are obtained. When these polymers are reacted with acrylic acid in the manner of Example 2, the corresponding acryloxypropyl substituted disiloxanes are obtained.

EXAMPLE 6

When a portion of the viscous silalkoxane polymer of Example 1 is mixed with an equivalent of trifluoroacetic acid and allowed to stand at room temperature for 24 hours with no acid catalyst added, there is produced the disiloxane [F$_3$CCOOCH$_2$CH$_2$CH$_2$(Me)$_2$Si]$_2$O. In the same manner, acetic acid produced the corresponding acetoxy substituted product without catalyst present, but at a much slower rate.

EXAMPLE 7

Portions of the viscous silalkoxane polymer of Example 1 were reacted with a number of various acids in order to determine the relative rates of reaction of each. The reactions were carried out at room temperature with two exceptions, by mixing two equivalents of the acid with one equivalent of the silalkoxane reactant and 1 molar percent of p-toluenesulfonic acid based on the mols of acid reactant present. Samples were removed periodically from each reaction mass and titrated to determine the amount of unreacted acid present. In the case of adipic acid, dioxane was present as a mutual solvent and the reaction was carried out at 45° C. because the acid was insoluble in dioxane below that temperature. The reaction with succinic acid was carried out at 95° C. without solvent because of the low solubility of that acid in any suitable solvent. As a generality it was found that unsaturated acids having a double bond alpha to the carboxyl group reacted much more slowly than the corresponding saturated acids. Removal of the double bond to the beta position increased the reaction rate greatly, vinylacetic acid, for example, reacting some 60 times faster than crotonic acid.

The following table sets forth acids on which quantitative reaction rate data was obtained. An arbitrary value of 1.0 was assigned to acetic acid as the standard for comparison. The "conversion" is based on the quantity of polymer which reacted in the stated time.

*Table I*

| Carboxylic acid | Relative rate | Conversion | |
|---|---|---|---|
| | | Percent | Hours |
| CH$_3$COOH | 1.0 | 94 | 21 |
| CH$_3$CH$_2$COOH | 0.57 | 90 | 23 |
| CH$_2$=CHCOOH | 0.038 | 90 | 263 |
| CH$_2$=C(Me)COOH | 0.014 | 80 | 691 |
| CH$_2$=CHCH$_2$COOH | 1.38 | 97 | 3.5 |
| CF$_3$COOH | 1.54 | 92 | 6 |
| CH$_3$CH=CHCOOH | 0.02 | 89 | 526 |
| (CH$_2$COOH)$_2$ | (¹) | 85 | 195 |
| (CH$_2$CH$_2$COOH)$_2$ | (¹) | 85 | 16 |
| ClCH$_2$COOH | 3.38 | 95 | 20.5 |

¹ Different reaction conditions made relative rates meaningless.

EXAMPLE 8

By reacting MeHSiCl$_2$ with allyl acetate in the manner of Example 1, there was produced $$Me(AcOCH_2CH_2CH_2)SiCl_2$$

When this material is mixed with equimolar amounts of MeSiCl$_3$, MePhSiCl$_2$, and PhSiCl$_3$ in an amount of toluene equal to the weight of the total silanes and the solution hydrolyzed by addition to an excess of water, a copolymer is obtained consisting essentially of MeSiO$_{1.5}$, MePhSiO, PhSiO$_{1.5}$ and $$Me(AcOCH_2CH_2CH_2)SiO$$

units. When the solution of this copolymer is subjected to alcoholysis with alcoholic KOH, followed by condensation and the azeotropic removal of water, a copolymer of the first three units with $$\begin{array}{c}-\mathrm{Si(Me)CH_2CH_2CH_2O-}\\|\\\mathrm{O}\\|\end{array}$$

units is produced. When the toluene solution of this copolymer is refluxed with acrylic acid equivalent to the latter units in the presence of 1% by weight of sulfuric acid based on the weight of organosilicon polymer, a copolymer of the first three units with $$\begin{array}{c}-\mathrm{Si(Me)CH_2CH_2CH_2OOCCH=CH_2}\\|\\\mathrm{O}\\|\end{array}$$

units is produced.

That which is claimed is:

1. The process which comprises reacting (I) an organosilicon compound selected from the group consisting of (A) cyclosilalkoxanes having the general formula [—SiR$_2$CH$_2$CHZ(CH$_2$)$_n$O—]$_x$ where $x$ has an average value of at least 1, (B) linear polymeric silalkoxanes consisting essentially of units of the formula $$[-SiR_2CH_2CHZ(CH_2)_nO-]$$

and (C) copolymeric siloxanes consisting essentially of (1) from 5 to 99.9 inclusive molar percent of units of the formula $$\left[\begin{array}{c}-\mathrm{SiR}_y\mathrm{CH_2CHZ(CH_2)}_n\mathrm{O}-\\|\\\mathrm{O}_{2-y}\end{array}\right]$$

where $y$ is an integer of from 1 to 2 inclusive and (2) from 0.1 to 95 inclusive molar percent of units of the formula $$R'_m SiO_{\frac{4-m}{2}}$$

where $m$ is an integer of from 1 to 3 inclusive and has an average value not greater than 2.5, in the above formulas R being a monovalent hydrocarbon radical free of aliphatic unsaturation, R' being a monovalent hydrocarbon radical, Z being selected from the group consisting of H and CH$_3$, and $n$ being an integer of from 1 to 2 inclusive; with (II) a carboxylic acid, by contacting (I) and (II) in a liquid phase.

2. A process in accordance with claim 1 wherein the reaction is conducted in the presence of an acid catalyst for the reaction, said acid catalyst having a dissociation constant of at least 0.01 at 25° C. and being present in an amount of at least 0.01% by weight based upon the weight of the organosilicon compound present.

3. The process which comprises reacting a cyclosilalkoxane of the formula $$\begin{array}{c}(\mathrm{CH_3})_2\mathrm{SiCH_2CH_2CH_2O}\\|\qquad\qquad\qquad\qquad|\end{array}$$

with a carboxylic acid selected from the group consisting of acids of the formulas R$^2$COOH and R$^3$(COOH)$_2$ where $R^2$ and $R^3$ represent monovalent and divalent organic radicals respectively and are respectively selected from the group consisting of monovalent- and divalent hydrocarbon, halogenated hydrocarbon, hydroxy substituted hydrocarbon, alkoxy substituted hydrocarbon, aryloxy substituted hydrocarbon, and haloaryloxy substituted hydrocarbon radicals, by contacting the said cyclosilalkoxane with the carboxylic acid in a liquid phase in the presence of from 0.1 to 10 inclusive percent by weight based on the weight of the silalkoxane of a catalyst which is an acid having a dissociation constant of at least 0.01 at 25° C.

4. A process in accordance with claim 3 wherein the catalyst is selected from the group consisting of sulfuric acid and p-toluenesulfonic acid.

5. The process which comprises reacting a polymeric silalkoxane consisting essentially of units of the formula $[-Si(CH_3)_2CH_2CH_2CH_2O-]$ with a carboxylic acid selected from the group consisting of acids of the formulas $R^2COOH$ and $R^3(COOH)_2$ where $R^2$ and $R^3$ represent monovalent and divalent organic radicals respectively and are respectively selected from the group consisting of monovalent- and divalent hydrocarbon, halogenated hydrocarbon, hydroxy substituted hydrocarbon, alkoxy substituted hydrocarbon, aryloxy substituted hydrocarbon, and haloaryloxy substituted hydrocarbon radicals, by contacting the said cyclosilalkoxane with the carboxylic acid in a liquid phase in the presence of from 0.1 to 10 inclusive percent by weight based on the weight of the silalkoxane of a catalyst which is an acid having a dissociation constant of at least 0.01 at 25° C.

6. A process in accordance with claim 5 wherein the catalyst is selected from the group consisting of sulfuric acid and p-toluenesulfonic acid.

7. A process in accordance with claim 5 wherein the carboxylic acid is acrylic acid.

8. A process in accordance with claim 5 wherein the carboxylic acid is methacrylic acid.

9. A process in accordance with claim 5 wherein the carboxylic acid is acetic acid.

No references cited.